Aug. 15, 1967  H. EILBRACHT ETAL  3,336,281
PROCESS FOR SEPARATING ETHYLENE POLYMERS PRODUCED
UNDER HIGH PRESSURE AND APPARATUS THEREFOR
Filed June 21, 1960

INVENTORS:
HANS EILBRACHT
SIEBERT GOEBEL
WIELAND ZACHER
BY
Marzall, Johnston, Cook & Root
ATT'YS 3,336,281
PROCESS FOR SEPARATING ETHYLENE POLYMERS PRODUCED UNDER HIGH PRESSURE AND APPARATUS THEREFOR
Hans Eilbracht, Siebert Goebel, and Wieland Zacher, Ludwigshafen (Rhine), Germany, assignors to Badische Anilin- & Soda-Fabrik Aktiengesellschaft, Ludwigshafen (Rhine), Germany
Filed June 21, 1960, Ser. No. 37,675
Claims priority, application Germany, June 23, 1959, B 53,705
2 Claims. (Cl. 260—94.9)

This invention generally relates to a new and improved polymerization process whereby the high polymers obtained can be efficiently separated from unreacted starting materials and the low-molecular products formed in the polymerization. More specifically, it relates to a new and improved process for separating polyethylene from unreacted ethylene and unwanted byproducts formed in the polymerization process. It also relates to the type of apparatus needed for carrying out this process.

It has heretofore already been known to carry out the polymerization of ethylene at pressures above 500 atmospheres and at temperatures between 100° and 400° C. According to this prior art method the polyethylene formed at a conversion rate of from 10 to 25 percent by weight is decompressed together with the unreacted ethylene through an expansion valve into a high-pressure separator in which the separation occurs at a pressure of, for example, 250 atmospheres and a temperature of, for example, between 200° and 300° C. The bulk of the unreacted ethylene, after having been stripped from the polyethylene, is re-compressed from 250 atmospheres to the reaction pressure and returned to the reaction, while the ethylene in the high-pressure separator is decompressed with the polyethylene, as a carrier gas used at a rate of from 70 to 100 parts by weight with reference to the polyethylene, from the high-pressure separator into a low-pressure separator down to a pressure of one atmosphere. The polyethylene is then separated and the ethylene is recompressed and recycled back to the reaction. It is also possible according to this method to decompress the reaction mixture consisting of polyethylene and unreacted ethylene from the reaction chamber directly into the low-pressure separator and, after separation of the polymerization product, to re-compress the gas and return it to the reaction.

Among the inconveniences encountered in the practice of the said prior art method the one most unpleasantly felt was the inability to remove to a satisfactory extent the highly branched, unsaturated, low molecular weight byproducts formed in the polymerization process. These products, when returned to the polymerization together with the ethylene gas under a pressure of 200 atmospheres, interfere with the smooth running of the reaction. Moreover, when allowed to stay in the polyethylene, they impair the quality thereof.

One object of the present invention is a process by which high-pressure polyethylene can be satisfactorily stripped of unreacted ethylene and unwanted substances.

Another object of the invention is to remove from the polyethylene the unreacted ethylene and the low molecular weight byproducts formed in the polymerization process.

Another object of the invention is a process whereby the low molecular weight products are separated from the recycle gas and thus prevented from returning into the reactor.

Another object of the invention is to prevent the low molecular weight products from entering into the polyethylene and being discharged therewith.

Another object of the invention is a process whereby the ethylene is decompressed to a temperature below 0° C., but above the volatilization temperature of ethylene at the pressure prevailing in the separator.

Another object of the invention is to effect the separation of the polyethylene and the unreacted gas by directing the materials discharged from the reactor tangentially against the inner wall of the high-pressure separator in order to thus maintain a certain level of the polyethylene in the high-pressure separator and to prevent any polyethylene from being entrained by the ethylene leaving the high-pressure separator.

All of the objects are achieved by the process in accordance with the present invention which will hereinafter be described in detail with reference to the accompanying drawing in which FIG. 1 is an overall view of the reaction system illustrating the manner in which the process is performed and the means with which the object of our invention can be accomplished;

Figure 1:
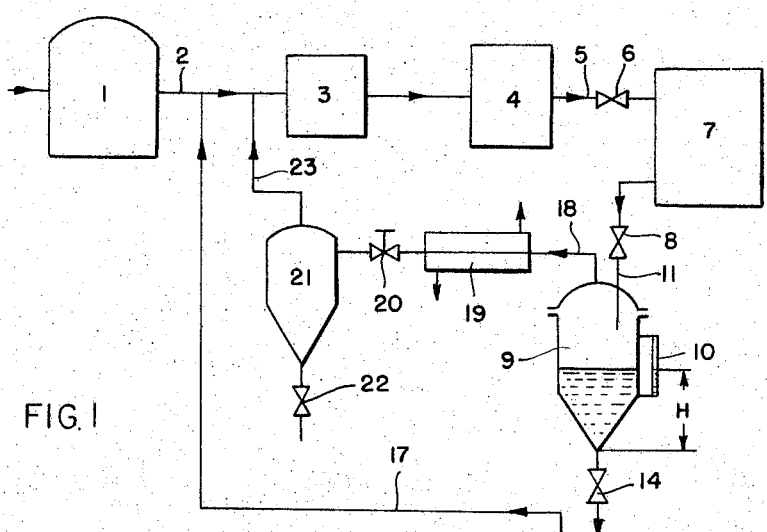
Figure 2:
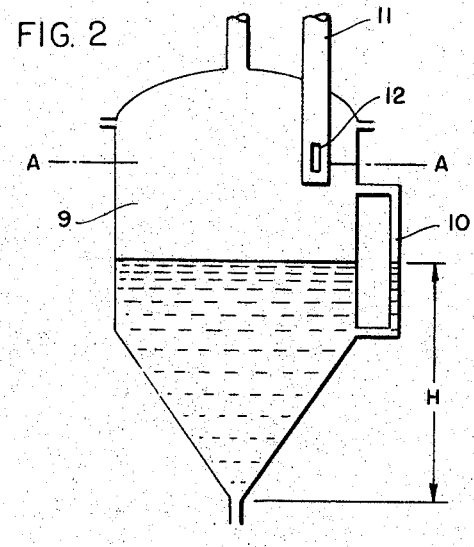
FIG. 2 is a sectional elevation of the high-pressure separator into which the substances leaving the reactor are decompressed.

Referring now to FIGURE 1, 1 is an ethylene container from which, through a line 2, the monomer is supplied to a pre-compressor 3 in which it is compressed to about 250 atmospheres and hence to an additional compressor 4 in which it is compressed to a pressure above 500 atmospheres. At this pressure the ethylene passes through a line 5 and a valve 6 into a reactor 7 in which polymerization takes place. From the reactor 7 the hot mixture consisting of polyethylene, unreacted ethylene and low molecular weight byproducts is decompressed through an expansion valve 8 into a high-pressure separator 9 in which a pressure above 200 atmospheres is maintained. This pressure is required in order to prevent any low molecular weight byproducts from being deposited together with the polyethylene in the high-pressure separator.

In the high-pressure separator 9 the polyethylene is separated from the bulk of the unreacted ethylene and the unwanted low molecular constituents dissolved therein, and collects in the lower part of the separator. The polyethylene, which is maintained at a constant level H, is then discharged through a valve 14 into a separator 15 in which the small amounts of ethylene dissolved in the polyethylene are removed. No carrier gas need therefore be used and as a result no low molecular weight products go into the end product. The polyethylene can be discharged through a valve 16, while the ethylene disengaged and collected in the low-pressure separator 15 is fed back through line 17 to the pre-compressor 3 and thus returned to the reaction.

The ethylene separated in the high-pressure separator 9 leaves through line 18 and, after passing through a cooler 19, is expanded to low pressure into a separator 21 through a valve 20. In this separator the low molecular weight byproducts dissolved in the gas are deposited in an oily to greasy consistency and discharged through a valve 22. As a result the said byproducts do not pass into the reactor together with the recycling gas and thus neither interfere in any way with the process nor affect the quality of the end product.

The temperature at which the ethylene gas arrives at the expansion valve 20 is preferably so chosen that a very low temperature, say minus 65° C., is set up on the low-pressure side of the valve. At a temperature as low as this the vapor pressures of the low molecular weight constituents are so law that only negligible amounts of low molecular weight materials are entrained, nor does the ethylene undergo liquefaction.

The low molecular weight byproducts stripped from the recycle gas by the expansion through the valve 20 are discharged from the separator 21 through the valve 22, while the cycle gas passes to the pre-compressor 3 through line 23 and thence to the additional compressor 4 from which it is returned to the reactor 7 under reaction pressure.

On being decompressed through the valve 8 from the reactor 7 the polymer and the unreacted gas rush into the separator 9 at an extremely high speed of flow. This makes it difficult to maintain a certain level of the polymer in the separator and to prevent appreciable quantities of the polymer from being entrained together with the cycling ethylene gas through line 18.

Figure 4:
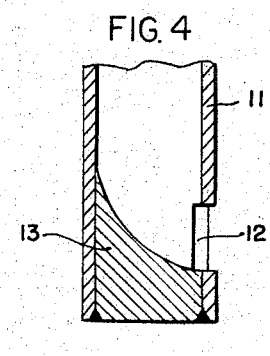
FIG. 4 is an enlarged detail in longitudinal and cross-sectional view of a device provided in the high-pressure separator for separating the polyethylene from the accompanying materials by directing the substances discharged from the reactor tangentially against the inner wall of the high-pressure separator.
Figure 3:
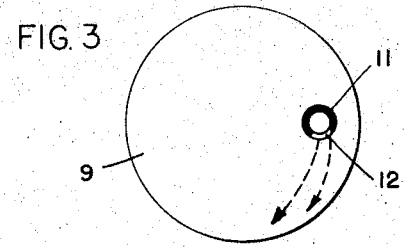
FIG. 3 is a cross-section through the high-pressure separator along the line A—A.

In accordance with our invention this drawback is remedied by the special structural design of the tube 11 which connects the reactor 7 to the separator 9. The special type of tube to be used in accordance with our invention is closed at its lower end, having an essentially rectangular opening 12 on its side at a small distance above its bottom level. This type of tube is shown in greater detail in FIGURE 4. As shown, 11 is the wall of the tube and 12 is the lateral rectangular opening, while 13 is an insert having a concave surface, which at the same time fills in the dead space underneath the opening 12, thus preventing polyethylene from being deposited therein, and serves as a baffle to deflect and smoothen the flow of the products discharged from the reactor 7. This insert may be fastened to the tube for example by screwing or welding.

In the practice of the process according to our invention the mixture of the polymer and the unreacted gas, when leaving the tube 11 through the opening 12, is thrown tangentially against the cylindrical inner wall of the upper portion of the separator 9 with the polyethylene being led in a vortex-like movement. In this manner it is possible to maintain a constant level of the molten polyethylene in the separator 9 and to prevent part of the polyethylene from being carried away with the recycle gas through line 18.

To illustrate, the process of the invention relates to a continuous gas phase polymerization of ethylene at a temperature between 100° and 400° C. and a pressure of at least 500 atmospheres wherein the polyethylene produced is stripped of unreacted ethylene and low molecular weight by-products by feeding a reaction mixture comprising polyethylene, ethylene and low molecular weight by-products directly from the reaction zone directly into a first separator. The polyethylene is separated from the unreacted ethylene. The pressure in the first separator is above 200 atmospheres. The ethylene and by-products are discharged from the first separator into a cooling zone. The polyethylene is discharged from the first separator into a second separator in which the pressure is about one atmosphere. The cooled ethylene gas containing the low molecular weight by-products flow to a third separator. The ethylene in the third separator is expanded to a pressure of about one atmosphere to separate the ethylene from oily and semisolid by-product constituents. The temperature of the ethylene prior to decompression to about one atmosphere is below 0° C. but above the volatilization temperature of ethylene after it has been decompressed. The ethylene is discharged from the third separator, recompressed to polymerization pressure, and returned to the reaction zone.

In summary, the present invention provides an efficient method for stripping polyethylene of unwanted and troublesome low molecular weight products and for preventing the said products from being returned to the reaction together with the recycle gas.

We claim:

1. In a process for the continuous gas-phase polymerization of ethylene in a polymerization zone at a temperature between 100° C. and 400° C. and a pressure of at least 500 atmospheres, thereby producing a hot reaction mixture comprising molten polyethylene, unreacted ethylene gas and low molecular weight by-products produced in said polymerization, the improvement which comprises discharging said hot reaction mixture from said polymerization zone, decompressing said hot reaction mixture to a first decompression pressure between the pressure in said polymerization zone and 200 atmospheres, feeding said hot reaction mixture at said first decompression pressure into a first separator maintained at said first decompression pressure, separating the molten polyethylene from the bulk of said unreacted ethylene and said by-products in said first separator while maintaining in the bottom portion of said first separator a body of molten polyethylene, removing from the upper portion of said first separator the separated, hot composite of unreacted ethylene gas and by-products, said hot reaction mixture being fed into the upper portion of said first separator at very high flow velocity horizontally and tangentially against the inner wall of the upper portion of said separator, which inner wall is cylindrical, thereby facilitating the maintenance of a substantially constant level of said body of molten polyethylene in said first separator and preventing polyethylene from being carried from said first separator with said hot composite, cooling said removed, hot composite in a cooling zone at said first decompression pressure, decompressing the cooled composite of ethylene gas and by-products to a pressure of about one atmosphere, said cooling in said cooling zone and said decompression to about one atmosphere together lowering the temperature of said composite at about one atmosphere to a temperature below 0° C. and above the volatilization temperature of ethylene at about one atmosphere, separating at said last-mentioned temperature and at about one atmosphere the ethylene gas from said by-products, the latter being at this stage oily and semi-solid, discharging said separated, cooled, ethylene gas from said second separator, recompressing said separated ethylene gas, which is essentially free from said by-products, to said polymerization pressure and returning the recompressed, purified ethylene to said polymerization zone, removing said molten polyethylene from the bottom portion of said first separator while maintaining said body of molten polyethylene in said bottom portion of said first separator, decompressing said removed, molten polyethylene to about one atmosphere, and separating in a third separator said molten polyethylene and ethylene gas released therefrom by said last-mentioned decompression.

2. A process as claimed in claim 1 wherein said temperature of said composite at about one atmosphere is about −65° C.

(References on following page)

References Cited

UNITED STATES PATENTS

| | | | |
|---|---|---|---|
| 2,728,753 | 12/1955 | Russum et al. | 260—94.9 |
| 2,728,755 | 12/1955 | Weiseman | 260—94.9 |
| 2,880,169 | 3/1959 | Boisture | 208—48 |
| 2,908,734 | 10/1959 | Cottle | 260—94.9 |

FOREIGN PATENTS

| | | |
|---|---|---|
| 449,804 | 7/1948 | Canada. |
| 777,197 | 6/1957 | Great Britain. |

OTHER REFERENCES

Renfrew et al.: "Polyethylene," Interscience, 2nd ed., 1960, (p. 14 relied upon).

JOSEPH L. SCHOFER, *Primary Examiner.*

M. LIEBMAN, L. H. GASTON, *Examiners.*

F. L. DENSON, *Assistant Examiner.*